United States Patent [19]
Schrader

[11] 3,728,425
[45] Apr. 17, 1973

[54] PROCESS FOR POTTING HOLLOW FIBER MEMBRANES

[75] Inventor: Paul G. Schrader, Antioch, Calif.
[73] Assignee: The Dow Chemical Company, Midland, Mich.
[22] Filed: May 23, 1968
[21] Appl. No.: 731,614

[52] U.S. Cl. .................. 264/49, 106/176, 156/330, 210/500, 260/30.4 EP, 260/230 R, 260/830 TW, 264/258
[51] Int. Cl. ......... B29d 7/20, B29d 27/00, D01f 3/40
[58] Field of Search ...................... 264/41, 49, 258, 264/263; 260/75 EP, 830 TW, 230 R; 156/330

[56] References Cited

UNITED STATES PATENTS

| | | | |
|---|---|---|---|
| 3,532,527 | 10/1970 | Skiens | 106/176 |
| 3,551,331 | 12/1970 | Cescon et al. | 210/23 |
| 2,935,488 | 5/1960 | Phillips et al. | 260/830 TW |
| 3,276,996 | 10/1966 | Lazare | 264/49 X |

FOREIGN PATENTS OR APPLICATIONS

| | | | |
|---|---|---|---|
| 1,044,503 | 10/1966 | Great Britain | 264/49 |

OTHER PUBLICATIONS

Mahon, Henry I., "Hollow Fibers as Membranes for Reverse Osmosis." In Desalination Research Conference; proceeding of the Conference on Desalination Research; organized and convened by the National Academy of Sciences – National Research Council at Woods Hole, Massachusetts, 19 June – 14 July, 1961. U. S. Office of Saline Water. Publ. 942, Washington, D.C., 1963, pp. 345-348.

*Primary Examiner*—Philip E. Anderson
*Attorney*—Griswold and Burdick, H. L. Aamoth and A. R. Lindstrom

[57] ABSTRACT

An improved method for potting plasticized, acetylated cellulose hollow fibers is disclosed wherein an improved bond between the cured resin and the fiber results when the resin comprises a polyepoxide resin, from 6 to 100 phr of an aromatic amine and from 0.5 to 5 phr of a thixotropic agent. The thixotropic agent imparts desirable application characteristics to the uncured resin and, particularly, minimizes wicking.

11 Claims, 2 Drawing Figures

Fig. 1
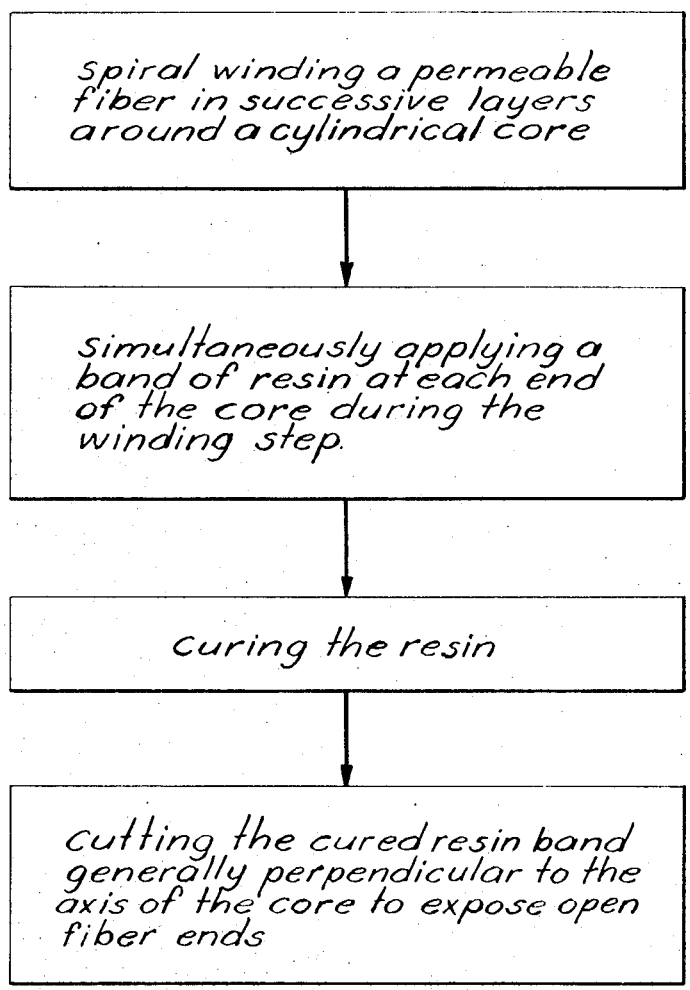
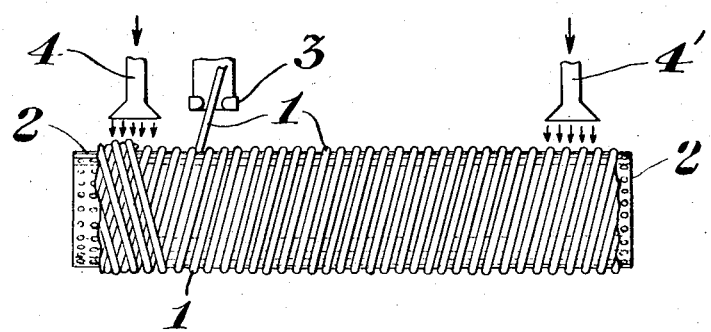
Fig. 2

PROCESS FOR POTTING HOLLOW FIBER MEMBRANES

BACKGROUND OF THE INVENTION

This invention relates to hollow fiber separatory devices wherein, generally, the terminal portions of the hollow fibers are secured (potted) in a header tube sheet member. More particularly the invention relates to devices utilizing acetylated cellulose hollow fibers, to an improved header tube sheet and to an improved method of securing (potting) the fibers in said tube sheet.

A significant advance in the art of separation of permeable components in a fluid stream by dialysis, osmosis, reverse osmosis and the like resulted when the flat permeable membranes formerly used were replaced by permeable hollow fiber membranes. The advantages of hollow fibers are enumerated in a number of patents and other publications. Patents of interest to permeable hollow fiber separatory apparatus include U.S. Pat. Nos. 3,228,876 and 3,228,877 to Mahon; 3,228,797 to Brown et al.; 3,186,941 to Skiens; 3,339,341 to Maxwell et al. and others.

Separatory devices which utilize permeable hollow fibers may be constructed in a variety of configurations, but whatever the geometrical arrangement of the fibers they usually terminate in a header tube sheet member comprised of a thermoset resin. Devices with a single tube sheet wherein the fiber is looped and each end terminates in the same tube sheet or devices with two tube sheets are both known. Of particular importance to the operation of these devices is the bond or seal formed between the resin tube sheet and the exterior surface of the fiber. The bond must be strong enough to resist a variety of solvents or solutions, swelling and deswelling of the fiber, operational variations such as pressure and temperature, etc. without developing leaks.

A particularly useful fiber is acetylated cellulose hollow fiber, but in the plasticized state the fiber is difficult to bond to the resin tube sheet because leaching of the fiber to remove the plasticizer causes the fiber to shrink which tends to pull the fiber away from the tube sheet. Certain other manufacturing needs generally require that the plasticizer be leached from the fiber after it is potted rather than before. The problem is most troublesome when sulfolane is the plasticizer.

SUMMARY OF THE INVENTION

Accordingly this invention provides for an improved method of bonding a thermoset resin header tube sheet member to plasticized, acetylated cellulosic hollow fibers secured therein. It is directed to the preparation of said tube sheet by potting the plasticized fibers in a polyepoxide resin formulation comprising from 6 to 100 parts per hundred parts of resin (phr) of an aromatic amine and from 0.5 to 5 phr of a thixotropic agent. Generally, the invention relates to hollow fiber separatory devices utilizing said hollow fibers as the permeable membrane.

DRAWINGS

The invention may be more fully understood and the advantages thereof appreciated from the following description and with reference to the non-limiting drawings.

FIG. 1 is a schematic representation of the improved process employing the specific polyepoxide resin formulations disclosed herein.

FIG. 2 is a more detailed view of the spiral winding step with simultaneous application of the resin at the ends of the structure.

DETAILED DESCRIPTION

Permeable hollow fiber separatory devices require a good bond between the resin tube sheet and the hollow fibers secured therein. This bond must be able to resist variations in temperature, pressure, the swelling or deswelling action of various solvents and/or solutions and the like. For general overall solvent resistance, inertness, ease of application, etc. polyepoxide resins are a preferred thermosetting resin.

However, when the fiber is a plasticized, acetylated cellulose hollow fiber the bonding between the fiber and any one particular polyepoxide resin formulation chosen from the multitude of possible formulations is quite unpredictable. This is especially true when the plasticizer is sulfolane, a substituted sulfolane derivative, or the like. Plasticizers are necessary in order that the acetylated cellulose may be melt extruded into a hollow fiber without decomposition. Sulfolane is a preferred plasticizer and an average degree of acetylation of the cellulose of about 2.5 is preferred. After the fiber has been formed, the plasticizer can then be leached from the fiber to increase the permeability of the fiber membrane.

Additionally, the manufacture of separatory devices utilizing hollow fibers requires a resin having certain application characteristics and, in particular, characteristics which allow the resin to thoroughly penetrate a bundle of fine fibers and wet the fiber surface without exhibiting any pronounced wicking tendencies.

In view of this unpredictability in selecting a polyepoxide resin formulation it has been found that a good bond between the plasticized fiber and the resin will be formed on curing if the polyepoxide resin is formulated to contain an aromatic amine and a thixotropic agent. Further, the formulation has the, above, desired application characteristics.

The polyepoxide resin formulation comprises from 6 to 100 phr of an aromatic amine and from 0.5 to 5 phr of a thixotropic agent. Preferably the formulation contains from 10 to 50 phr of an aromatic amine and from 1 to 3 phr of a thixotropic agent.

Advantageously the formulation may contain other ingredients which further improve the bond and other cured properties but which are not necessary to obtain the benefits of this invention. The formulation may contain from 10 to 100 phr of a reactive diluent, from 5 to 15 phr parts of a plasticizer and from 1 to 2 phr of a bond promoter as well as lesser amounts of a thixotropic coupling agent or a cure accelerator. These optional ingredients may also improve the resin cure rate or the handling characteristics of the uncured resin formulation.

Polyepoxide resins which have been found suitable for the resin formulations of this invention include glycidyl polyethers of polyhydric phenols. Illustrative of the polyhydric phenols are mononuclear phenols, polynuclear phenols and included within the latter are the phenol-aldehyde condensation resins commonly known as novolac resins. Typical mononuclear phenols include resorcinol, catechol, hydroquinone, phloroglucinol and the like. Examples of polynuclear phenols include 2,2bis (4-hydroxyphenyl)propane (bisphenol A) 4,4'-dihydroxybenzophenone, 1,1-bis(4-hydroxyphenyl)ethane, bis(2-hydroxynaphthyl)methane, 2,2-bis(4-hydroxyphenyl) butane, 4,4'-dihydroxyphenyl phenyl sulfone and the like. Novolac resins include the condensation products of phenol-formaldehyde and the like.

The preparation of such resins is well known and is described in a number of patents such as U.S. Pat. No. 2,935,488 and others and in textbooks such as Lee and Neville, "Epoxy Resins" McGraw-Hill Book Co., 1957.

The polyepoxide resin formulation contains an aromatic amine as a curing agent. A variety of aromatic amines are suitable including meta phenylene diamine, diamino diphenyl sulfone, 4,4'methylene dianiline, 2,6-diaminopyridine, 4-chloro-ortho-phenylenediamine and the like. Mixtures of said amines and especially eutectic mixtures may also be employed. Additionally, adducts of aromatic amine mixtures, such as Shell Curing Agent Z (also known as Epon Z) and the like may also be employed. Said Curing Agent Z is described, for example, in U.S. Pat. No. 3,339,633, Col. 11, as the adduct of m-phenylene diamine and methylene dianiline with phenyl glycidyl ether.

When liquid polyepoxide resins are brought into contact with hollow fibers such as contemplated herein, an undesirable tendency to wick along the fiber away from the site desired is frequently exhibited. However, a liquid resin is highly desirable in order to obtain intimate contact with the resin and the surface of the fiber and to thoroughly penetrate into a bundle of fibers when a very large number of extremely small bore fibers are potted.

These requirements are best met when the potting resin is made thixotropic. For the present compositions the thixotropic character can be imparted by incorporating small amounts of a colloidal silica such as that sold under the name of Cab-O-Sil. When colloidal silica is used a coupling agent may optionally be employed in the amounts of about 0.1 to 0.5 phr. Typically, coupling agents are hydroxy compounds and include glycols, glycerine, triethanol amine and the like.

A variety of other thixotropic agents may be used many of which are proprietary products but which in general include clays, organic modified clays, organic modified silicas, chemical derivatives of castor oil and the like.

Optionally, the resin compositions of this invention may also include from about 10 to 100 phr of a reactive diluent and preferably from 40 to 60 phr. Reactive diluents are well known and include 1,4-butanediol diglycidyl ether, diglycidyl ether, phenyl glycidyl ether, butyl glycidyl ether, glycidol, epichlorohydrin, triphenyl phosphite and like compounds.

Other optional ingredients include plasticizers, bond promoting agents and cure accelerators. Plasticizers include dibutyl phthalate, tricresyl phosphate, polypropylene glycol diglycidyl ethers, diethylene glycol diglycidyl ether and the like. Bond promoters typically include tertiary amines such as N,N,N',N'-tetramethyl butane diamine, dimethylaminopropylamine, benzyl dimethyl amine, N-methyl morpholine and the like.

While polyepoxide resin formulations of this invention which contain a plasticizer will cure at low temperatures, an accelerator is frequently desirable in order to obtain the needed degree of cure in a convenient period of time. Trace amounts, from about 0.05 to 0.5 weight percent based on the polyepoxide resin, of an accelerator may be used and include phenols such as resorcinol, etc., phenolic acids such as salicyclic acid, etc. and hydroxy aliphatic acids such as lactic acid, etc. Lactic acid is preferred.

The resin formulations of this invention may be cured by heating but they are designed to cure, generally, at ambient temperatures or slightly above. Curing can be accomplished by heating to 50° to 100° C or even higher for short periods of time, but the curing temperature or cure time is generally regulated by the thermal stability of the fiber and not the resin composition.

Further illustration of the present invention is shown in the following non-limiting examples.

EXAMPLE 1

A resin formulation was prepared from 4 parts of Resin A (a glycidyl polyether of bisphenol A having an epoxide equivalent weight of 186–192), 0.83 parts of Epon Z and 2 percent by weight based on total resin formulation of colloidal silica (Cab-O-Sil). Using this resin formulation a separatory element was fabricated from cellulose triacetate fibers containing sulfolane as a plasticizer.

Hollow fiber separatory elements can be prepared in a variety of ways and one method for preparing small laboratory test elements consisted essentially of Hollow fiber separatory elements can be prepared in a variety of ways. One method is illustrated schematically in FIG. 1 and in more detail in FIG. 2 for preparing small laboratory test elements, which method consists essentially of spirally winding a tow of hollow fibers 1 under controlled tension via fiber guide 3 around a rotating cylindrical core 2 (about 6 inches long) wherein the yarn guide 3 moves in a reciprocating motion parallel to the axis of the core so as to provide successive layers of fibers and simultaneously applying the resin by applicator 4 and 4' to the fibers at the ends of the core. After the resin is cured the ends are cut, generally perpendicular to the longitudinal axis of the fibers, to expose open fiber ends in the resin tube sheet. It is to be understood that the invention is not limited to the embodiment of the invention shown in FIGS. 1 and 2.

The above resin formulation was used to prepare a hollow fiber separatory element in a similar manner by potting the ends of a spirally wound core with said formulation and curing for 1 hour at 100°C. After leaching the sulfolane away from the fiber the resin header had an excellent bond to the fibers and the header showed excellent water resistance.

EXAMPLE 2

A simple test used for screening resins comprised a small mold made from a piece of ⅜ × 1-¼ inch piece of polyethylene tubing having a cork inserted in one end. The mold was set upright on the cork end and a looped bundle of hollow fibers inserted, loop end, into the mold cavity. The potting resin was then poured in and cured for up to 16 hours at about 50°C.

After curing, the ends of the tubing were cut to expose open fiber ends and the exposed tube sheet surface examined under a microscope. A poor resin can be detected by a visible separation between the fiber wall and the resin. If the fibers appeared to be well bonded the potting was soaked in distilled water. After 4 hours of soaking the exposed ends were examined again under the microscope. Most of the unsatisfactory formulations are detected by the 4 hour soak and practically all by a 24 hour soak.

The screening tests were usually made without the thixotropic agent in order to check the effectiveness of the bond first. Formulations which passed the screening test were then formulated with a thixotropic agent and used to manufacture actual separatory units, as in Example 1.

A series of formulations prepared with 4,4'-methylene dianiline as the curing agent and tested as above are summarized in Table I. All formulations when cured showed excellent water resistance and bonding to the fiber after soaking. Resin B is a glycidyl polyether of resorcinol having an epoxide equivalent weight of 124 to 140 and available commercially as Kopox 159. The following abbreviations are used.

| | |
|---|---|
| phr | parts per hundred parts of resin |
| TMBDA | N,N,N',N'-tetramethylbutanediamine |
| RD-2 | diglycidyl ether of 1,4-butanediol |
| DBP | dibutyl phthalate |
| P–1200 | polypropylene glycol, 1200 M.W., av. |
| BGE | butyl glycidyl ether |

All formulations contained stoichiometric amounts of 4,4'-methylenedianiline (i.e. 1 amine hydrogen equivalent weight per 1 epoxide equivalent weight) and 2 phr of TMBDA.

TABLE I

| Example | Resin | Reactive Diluent | Plasticizer |
|---|---|---|---|
| 2a | B | None | 18 phr DBP |
| 2b | B | 40 phr RD-2 | 54 phr P-1200 |
| 2c | A | None | 30 phr P-1200 |
| 2d | A | 50 phr RD-2 | 4 phr DBP |
| 2e | A | 10 phr BGE | None |

Formulations, such as those in Table I, are then formulated to contain a thixotropic agent and utilized to prepare hollow fiber test separatory units. For example, a formulation similar to the above prepared from 100 parts of Resin B, 20.75 parts of 4,4'-methylenedianiline and 2 parts of TMBDA passed the screening test and was then formulated to contain, additionally, 1.75 parts of colloidal silica (Cab-O-Sil). The silica containing formulation was then used to fabricate a separatory element from plasticized hollow cellulose triacetate fibers.

EXAMPLE 3

Another series of formulations was prepared with Epon Z (an adduct of phenyl glycidyl ether with 4,4'-methylene dianiline and m-phenylene diamine) and tested as in Example 2. Resin C is an epoxy novolac resin having an epoxide equivalent weight of 175 to 182. Resin D is a glycidyl polyether of bisphenol A having an epoxide equivalent weight of 172–178.

TABLE II

| Example | Resin | Epon Z | Reactive Diluent |
|---|---|---|---|
| 3a | C | 15 phr | None |
| 3b | D | 22 " | None |
| 3c | D | 25 " | 10 phr RD-2 |
| 3d | D | 18 " | 12 phr BGE |

All the above formulations, when cured, had excellent water resistance and bonding of the fiber to the resin after soaking. The addition of colloidal silica to the above formulations provides formulations with good thixotropic application characteristics.

EXAMPLE 4

Additional tests were made with Epon Z cured formulations and various other combinations of reactive diluents, plasticizers, bond promoters and the like. All formulations shown in Table III had excellent bonding of the fiber to the cured resin after soaking and excellent water resistance.

TABLE III

| Ex. | Resin | Epon Z | Reactive Diluent | Plasticizer | Bond Promoter |
|---|---|---|---|---|---|
| 4a | | 22 phr | 25 phr RD-2 | None | 1 phr TED |
| 4b | A | 22 " | 25 phr RD-2 | None | 1 phr BDMA |
| 4c | B | 25 " | None | 10 phr P-400 | None |
| 4d | A | 25 " | 10 phr BGE | None | None |
| 4e | A | 33 " | 5 phr RD-2 | 5 phr DBP | 1 phr TMBDA |
| 4f | A | 21 " | None | 10 phr DBP | None |
| 4g | A | 24 " | 10 phr GA | None | None |
| 4h | A | 26.5 " | 25 phr CGE | None | None |

Additional abbreviations used above include:
TED - Triethylene diamine (commercially available as "Dabco")
BDMA - benzyl dimethyl amine
GA - glycidyl acrylate
CGE - cresyl glycidyl ether
P-400 - Polypropylene glycol, 400 M.W.

EXAMPLE 5

Based on the previous tests with Epon Z, the following resin composition was used in the manufacture of a reverse osmosis separatory device in which the separatory element was prepared by potting cellulose triacetate hollow fibers plasticized with sulfolane. Following fabrication the hollow fibers were leached with water to remove the sulfolane plasticizer and increase the permeability. The resin formulation comprised:

100 parts of Resin D
10 parts of dibutyl phthalate
22 parts of Epon Z
1.75 parts of colloidal silica (Cab-O-Sil)
0.11 parts of triethanol amine
0.12 parts of lactic acid The lactic acid is a cure accelerator and the triethanol amine is a coupling agent for the silica.

As used, herein, the term potting refers to the process of curing a thermosettable resin having portions, usually terminal portions, of hollow fibers embedded or positioned in said resin.

The above examples are set forth for purposes of illustrating the present invention. Variations and modifications of the examples and written description will be obvious to those skilled in the art and may be made without departing from the scope of the invention as claimed.

I claim:

1. In the process of preparing a permeable hollow fiber membrane separatory apparatus wherein generally the terminal portions of said hollow fibers are secured in a header tube sheet member by potting said fiber terminal portions in a thermosettable resin, the improvement which comprises potting plasticized acetylated cellulose hollow fibers in a thermosettable resin consisting essentially of (a) a polyepoxide resin wherein said resin is a glycidyl polyether of a polyhydric phenol or a mixture of said resins, (b) from 6 to 100 parts per 100 parts of resin of an aromatic diamine and (c) a sufficient amount of a thixotropic agent within the proportions of about 0.5 to 5 parts per 100 parts of resin to prevent wicking of said resin along the fibers.

2. The improved process of claim 1 wherein said cellulose acetate fiber is plasticized with sulfolane.

3. The improved process of claim 1 wherein said poly-epoxide is an epoxy novolac resin, a glycidyl polyether of bisphenol A or a glycidyl polyether of resorcinol.

4. The improved process of claim 1 wherein said amine is 4,4'-methylene dianiline, m-phenylene diamine, a mixture of said amines or an adduct of a mixture of said amines with phenyl glycidyl ether.

5. The improved process of claim 1 wherein said thixotropic agent is colloidal silica.

6. The improved process of claim 1 further comprising from 5 to 100 phr of a reactive diluent selected from the group consisting of 1,4-butanediol diglycidyl ether, diglycidyl ether, glycidyl acrylate, phenyl glycidyl ether and butyl glycidyl ether.

7. The improved process of claim 1 further comprising from 1 to 2 phr of a tertiary amine bond promoter.

8. The improved process of claim 1 further comprising from 5 to 15 phr of a plasticizer.

9. The improved process of claim 1 further comprising from 0.05 to 0.5 phr of a cure accelerator.

10. The improved process of claim 9 wherein said accelerator is lactic acid.

11. The improved process of claim 1 further comprising the step of leaching the fiber to substantially remove the plasticizer.

* * * * *